Sept. 3, 1963 C. F. HENDEE ET AL 3,102,952
X-RAY FLUORESCENCE ANALYSIS OF MULTI-COMPONENT SYSTEMS
Filed May 27, 1954 2 Sheets-Sheet 1

INVENTORS
CHARLES F. HENDEE
SAMUEL FINE
BY
AGENT

Sept. 3, 1963     C. F. HENDEE ET AL     3,102,952
X-RAY FLUORESCENCE ANALYSIS OF MULTI-COMPONENT SYSTEMS
Filed May 27, 1954     2 Sheets-Sheet 2

INVENTORS
CHARLES F. HENDEE
SAMUEL FINE
BY
AGENT

3,102,952
X-RAY FLUORESCENCE ANALYSIS OF MULTI-COMPONENT SYSTEMS

Charles F. Hendee, Irvington, and Samuel Fine, New York, N.Y., assignors, by mesne assignments, to North American Philips Company, Inc., New York, N.Y., a corporation of Delaware
Filed May 27, 1954, Ser. No. 432,793
5 Claims. (Cl. 250—51.5)

This invention relates to a method for physico-chemically analyzing, both quantitatively and qualitatively, the composition of a multi-component system.

A known technique of X-ray fluorescence analysis of multicomponent systems employs a single crystal as a dispersive element and a Geiger counter as a photon detector and counter. The fluorescent radiation from the specimen is reflected from the planes of the crystal depending upon its wavelength and the angular setting of the crystal in accordance with Bragg's Law, and the reflected radiation is detected by the Geiger counter, which is optically and mechanically coupled to the crystal in order to receive the desired radiation. The crystal angular setting provides the energy content or wavelength information concerning the fluorescent radiation, whereas the detector output furnishes the intensity information. This technique, however, suffers from the inherent drawback that most of the intensity of the radiation available at the source or the specimen is wasted, which is mainly due to the facts that only that radiation energy from a small solid angle of the specimen is utilized, the reflecting efficiency of the crystal is low, and the path along which the radiation must travel before being detected by the Geiger counter is long and therefore highly absorbing. A further disadvantage is that, for certain applications, no suitable reflecting crystals are available. Finally, apparatus employing this technique are complicated and expensive, and usually require skilled personnel to operate.

The chief object of the invention is to provide a new method of physico-chemically analyzing multi-component systems in a non-destructive manner which is characterized by high efficiency and simplicity.

A further object of the invention is the provision of suitable apparatus for physico-chemically analyzing multi-component systems which does not employ a crystal nor require a complex optical arrangement.

In accordance with the invention, the specimen comprising the multi-component system is bombarded by radiation of sufficient energy content to cause the elements therein to fluoresce and thereby emit fluorescent X-radiation which is characteristic of each element. The thus-produced fluorescent X-radiation is directly detected by a proportional counter. By the term "proportional counter," we mean a gas-filled discharge tube of the Geiger-Mueller type comprising a cylindrical cathode and a central anode wire, between the electrodes of which is applied a potential difference such that the tube operates in the proportional region of its discharge characteristic, and which produces output information in the form of voltage pulses from which not only the intensity but also the energy content of the incident fluorescent radiation may be derived. Coupled to the counter is a device for analyzing the information thus provided, for example, a single or multi-channel pulse height analyzer or any other device for determining the amplitudes of the pulses produced by the counter, and to which in turn are coupled means for indicating or recording the results.

The results will consist of pulse information involving both amplitudes and numbers of counts per second. The former provides the energy content or wavelength of the fluorescent radiation, from which the elemental composition of the specimen may be determined, and the latter furnishes the quantity of that element present in the system.

According to a further aspect of the invention, we have found that the width of the pulse height distribution of the recorded pulses, properly correlated to a standard, is characteristic of each element of the periodic table. Consequently, this width may also be employed to identify the composition of the specimen.

The method described above offers many advantages over the known arrangements. First, a considerably smaller quantity of the fluorescent radiation emanating from the specimen is wasted because the proportional counter window through which the radiation is received may be positioned practically to engage the specimen itself. Secondly, inasmuch as no reflecting crystal, filters or complex optical systems need be employed, there is still a further reduction in radiation losses of the arrangement, as well as a considerable simplification in construction and reduction in cost. Thirdly, the method affords approximately constant resolution of emission energies of adjacent elements over the whole range of elements constituting the periodic table. Fourthly, the proportional counter affords a counting rate which is far beyond that possible with a Geiger counter without any accompanying reduction in linearity. Finally, the method and apparatus of the invention provides two distinct parts of information, to wit, peak positions and width, each of which separately may serve to identify the elements; hence, corroboration of a particular result is readily available from the information provided by the apparatus.

The invention will now be described in connection with the accompanying drawing, wherein.

Figure 1:
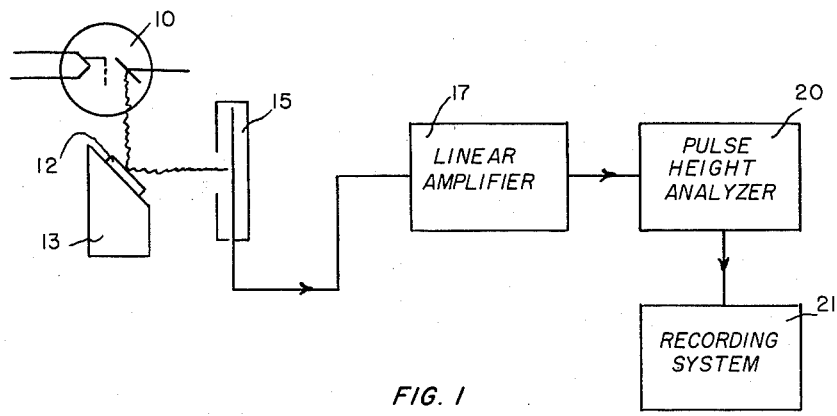
FIG. 1 is a schematic view of an apparatus for use in the invention.

Referring now to FIG. 1, one form of apparatus for carrying out the invention comprises a source 10 of primary energy producing radiation of sufficient energy content to excite the elements of a specimen into an energy state at which fluorescent radiation is emanated thereby. The source 10 may be either a radioactive source or a high energy X-ray tube as depicted in the figure. In some applications, the tube is convenient inasmuch as the energy of its radiation, as well as its intensity, is readily adjusted to the desired value by merely varying the voltage or current of the tube. The primary radiation produced by the tube 10 impinges on a specimen 12 fixedly mounted in its path. The specimen 12, which constitutes the multi-component system to be analyzed, is fixedly mounted on a support 13, and may be in either a solid or powdered state, or in a liquid state. Upon bombardment by sufficiently high energy radiation, the elements constituting the specimen will be excited into states producing fluorescent radiation, which thus emanates from the specimen in all directions.

Positioned close to the specimen in a position to intercept as much as possible of this fluorescent radiation is a proportional counter 15. The exact position chosen is one which enables the counter to receive the maximum proportion of the fluorescent energy radiated by the specimen, and which, at the same time, prevents the counter from receiving primary energy from the source 10. In short, the counter is arranged to detect only the fluorescent energy emanating from the specimen. A preferred arrangement is illustrated in the figure, wherein the parts are mounted such that the source 10 and counter 15 are at right angles to one another, with the specimen being mounted at a 45° position with respect to both the primary and fluorescent beams of radiation. The proportional counter itself must exhibit good linearity at high counting rates, and high sensitivity toward the radiation to be detected. A suitable construction is that described and claimed in our copending U.S. application, Serial No. 404,524, filed January 18, 1954, now Patent No. 2,837,677, which has a gas filling of about 90% of xenon and 10% of an organic quench gas at a combined pressure of about 300 mm. of Hg.

Figure 2:
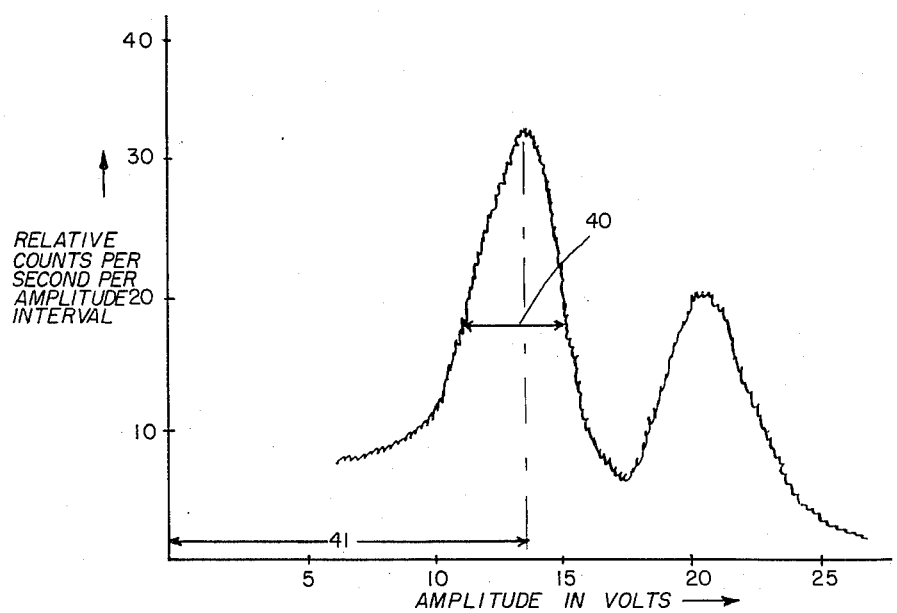
FIG. 2 is a graph showing the recorded results obtained with the apparatus shown in FIG. 1 on the determination of the metal content of a specimen containing approximately 50% of zirconium oxide and 50% of cadmium oxide by volume.

The output pulses of the proportional counter 15 are supplied to a linear amplifier 17, and to a pulse height analyzer 20. The absorption of incident energy by the counter 15 produces a pulse at the output thereof whose amplitude is proportional to the energy of the incident radiation; the number of these pulses, that is to say, the counts per second, depends upon the intensity of the incident radiation. The pulse height analyzer 20 serves to saparate the pulses of one amplitude interval or in a narrow amplitude range from all other pulses at different amplitudes. In effect, it acts as a window, allowing only those pulses of amplitudes within a narrow range to be transmitted, while rejecting all other pulses. Such a device is termed a single channel analyzer. By scanning through an amplitude range with the analyzer and recording the output thereof in terms of counts per second per amplitude interval on a recording system 21, such as a conventional strip-chart recorder, one obtains a pulse-height-distribution curve or graph such as illustrated in FIG. 2, which consists of a series of maxima at different amplitude levels, as shown on the abscissa which represents energy content, the value of the peak of the curve on the ordinate, which is in terms of counts per second, representing the intensity of that particular radiation. Other analyzers, so-called multi-channel pulse height analyzers, transmit to a plurality of different outlets only those pulses having amplitudes falling within a narrow range or channel. Hence, such devices do not require a scanning technique. As will be evident from the graph of FIG. 2, pulses exist over the whole amplitude range. This is due to the statistical nature of the absorption process and the gas amplification process within the counter. Thus, the output pulses are not limited to specific amplitude values but are spread over a broad range and tend to become clustered at amplitude values corresponding to the main wavelength components of the incident radiation.

The manner in which the thus-recorded information shown in FIG. 2 may be utilized to analyze the composition of the specimen will now be described in connection with a few illustrative examples. Let us first consider the case where the chemical constitution of the specimen is known, but not the proportions of the elements. For example, the specimen may consist of a powdered sample of a mixture containing zirconium oxide and cadmium oxide in about equal proportions. The K absorption edge of the element having the higher atomic number, in this case cadmium, is 26.7 kev. Consequently, the voltage of the X-ray tube is set at a value at which the highest energy X-radiation emitted is substantially above 26.7 kev. in order that the cadmium, and, of course, the zirconium, will be excited into fluorescence. For a K-absorption edge of 26.7 kev., a voltage of 33 kv. on the X-ray tube is suitable. The specimen is then placed on its holder and bombarded by the primary energy of the tube. The fluorescent radiation from the sample is detected by the counter and the resultant data thus obtained is illustrated in FIG. 2. As will be observed, there are two peaks, the one at the right at the higher energy representing the cadmium, and the one at the left at lower energy representing the zirconium. The ratio of the curve areas under the peaks, i.e., the ratio of the total number of counts per second resulting from the K-radiations from these elements, is a function of the amounts of each element in the specimen. In order to obtain absolute values, however, a series of calibration curves must first be obtained. This is accomplished by repeating the technique with standard specimens containing known amounts of cadmium and zirconium oxides. For most cases, five standards will be sufficient; for example, a series of samples containing pure zirconium oxide, pure cadmium oxide, and three others in ratios of 25:75, 50:50 and 75:25. By comparing the graph of FIG. 2 to the graphs obtained from the standards, one can determine, by interpolation, if necessary, the percentages of the zirconium and cadmium in the unknown specimen.

Let us now consider a second situation wherein neither the proportions nor the constitution of the speciman is known. In such a case, the voltage of the X-ray tube is set at its maximum value in order to excite the K shells of the elements having the highest atomic numbers. Where elements are present whose atomic number is such that its K shell cannot be excited by the radiation from the tube, then, generally speaking, at least its L shell will be excited and may be employed in the same manner as that described previously. The resultant data will consist of a series of peaks representing the K or L emissions of the various elements constituting the specimen. In order to correlate the information thus derived, since energy is represented on the abscissa (FIG. 2) in terms of volts and not in kev. units, a standard must be employed. The standard may be either internal or external. In the former, one or two known elements are included in the specimen and their respective peaks identified on the graph and utilized to determine the energy of the other peaks. In the case of the latter, without changing any of the conditions, a run is made with the apparatus on a known element, and its pulse amplitude in terms of volts determined. Let us assume that this value is 22 volts, and the element is molybdenum ($Z=42$), whose K emission is 17.4 kev. Hence, a pulse amplitude of 44 volts, assuming the presence of a substantially linear pulse amplifier and proportional counter, would represent an element having double the emission energy or half the wavelength, i.e., for example, the element cerium, which has an emission energy of 34.7 kev. It is readily evident from the foregoing that the peak positions on the curve can now be translated into emissions, which, from known data, may be employed to identify the element by name or atomic number. Once this has been accomplished, the proportions of the elements may be determined in the manner described above in connection with the first case.

The method described above is suitable for the case where the peaks are completely resolved as well as for those cases where the peaks overlap. In the latter situation, by establishing a pair of windows or amplitude intervals on either side of the center of the overlapped peaks, computing the ratio of the number of counts in each window, and comparing that ratio to the ratios obtained from a series of standards of different proportions wherein the windows are similarly located, one can determine the proportions of the elements giving rise to the fluorescent radiation.

According to a further aspect of the invention, we have found that other characteristics of the resultant data or graphs may also be utilized to identify elements. Specifically, we have found that the width of the pulse height distribution of the recorded pulses is characteristic of each element of the periodic table. That is, the width is proportional to the square root of the energy, and, in accordance with Moseley's Law, atomic number is approximately also proportional to the square root of the energy; therefore, the width is proportional to the atomic number. The technique involved is to measure the half-width, the width at half the peak value and which is, of course, characteristic of the width and is employed for convenience, of the resultant peak, which is designated by the reference number 40 in FIG. 2 and divide by the peak value of the pulse along the abscissa, which is designated by reference numeral 41, which, when multiplied by one hundred, gives the percent half-width. By comparing this value to the per-cent half-width of known elements obtained from the same equipment, one can readily compute the atomic number of the element producing the pulse and hence identify that element. The information thus utilized is completely independent from that previously used to identify the element; therefore, it can serve to corroborate the previous results.

It is to be emphasized that an important advantage realized from the aforedescribed method and apparatus is the approximately constant resolution of emission energies of adjacent elements which is obtained, independent of atomic number. Consequently, the apparatus has the same accuracy over the entire periodic table and, thus, no special computations are required for achieving high accuracy with different elements.

Figure 3:
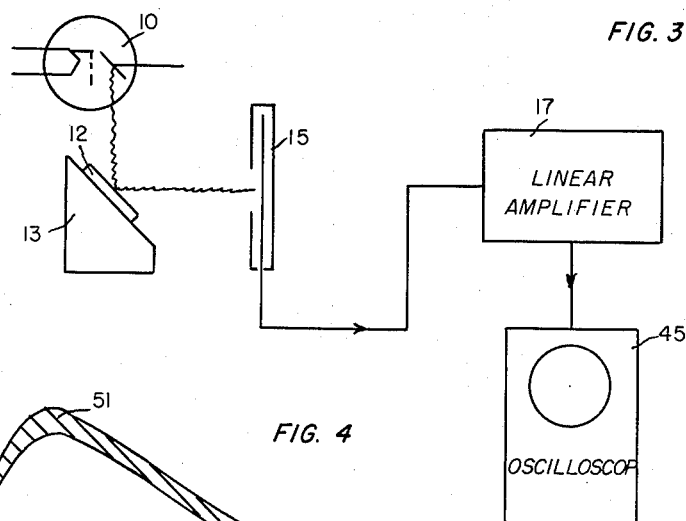
FIG. 3 is a schematic view of another form of apparatus useful in the invention employing an oscilloscope.

FIG. 3 illustrates another form of apparatus which is characterized by simplicity and rapidity of analysis, the elements in this figure corresponding to that of FIG. 1 having the same reference numerals. In this case, however, the output of the amplifier 17 is directly coupled to the vertical deflection circuits of an oscilloscope 45. The horizontal circuits are adjusted to be triggered by each pulse from the linear amplifier, and the rate of the horizontal scan circuits is set very high so that the full pulse is displayed on the face of the cathode-ray tube.

Figure 4:
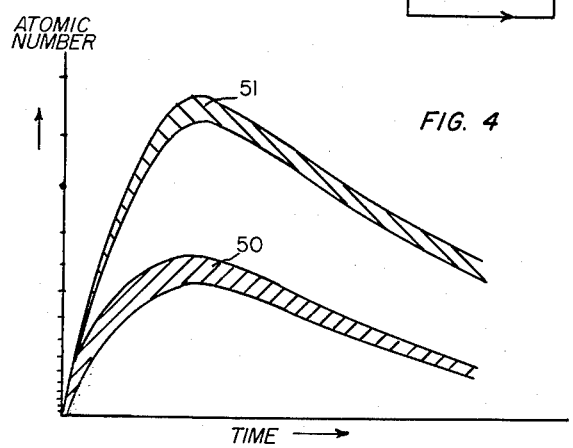
FIG. 4 illustrates the type of picture exhibited on the face of the oscilloscope of FIG. 3 when analyzing a mixture of two elements.

If the specimen 12 contains two constituents, a picture on the oscilloscope similar to that illustrated in FIG. 4 is observed, which shows two pulses 50, 51. The ordinate of the graph shown in FIG. 4 represents the amplitude in volts of the pulses, and the abscissa is a time base. As indicated in connection with FIG. 2, the amplitudes of the pulses at the output of the linear amplifier are a function of the energy content or atomic number of the elements giving rise to the fluorescent radiation. Hence, by suitable calibration, the ordinate on the scope face can be calibrated in terms of atomic number. Thus, the average height of the pulses represented thereon gives the atomic number of the element producing the fluorescent radiation which is converted into the pulses by the proportional counter. The cathode-ray tube, or rather the persistence of the luminescent screen of the cathode ray tube, of the oscilloscope in this case serves as the pulse amplitude discriminator by recording all pulses of different amplitudes directly on the screen of the tube. The proportions of the elements of the specimen 12 depends upon the number of counts per second or rate at which the pulses are recorded on the tube face. The element constituting the predominant constituent of the specimen will produce a greater number of pulses, which will manifest itself as a brighter trace on the cathode ray tube screen. Consequently, a rough estimate of the proportions is afforded by a visual comparison of the brightness of the two traces 50, 51. For more accurate results, a phototube may be employed to scan the brightness of the traces appearing on the screen of the cathode-ray tube, which, upon proper calibration to a standard, will provide reasonably accurate estimates of the proportions of the specimen constituents.

The apparatus illustrated in FIG. 3 provides a very rapid and accurate analysis of any specimen in a very simple manner. By fixing the distance between the specimen 12 and tube 10, and between the specimen and counter 15, by maintaining the amplification of the amplifier constant, and by fixing the voltages applied to the tube 10 and counter 15, the provision of any specimen on the support 13 will immediately produce a series of curves as illustrated in FIG. 4 on the screen of the oscilloscope, from which the atomic numbers and the names of the elements of the specimen may be read directly off the ordinate on the screen.

Figure 5:
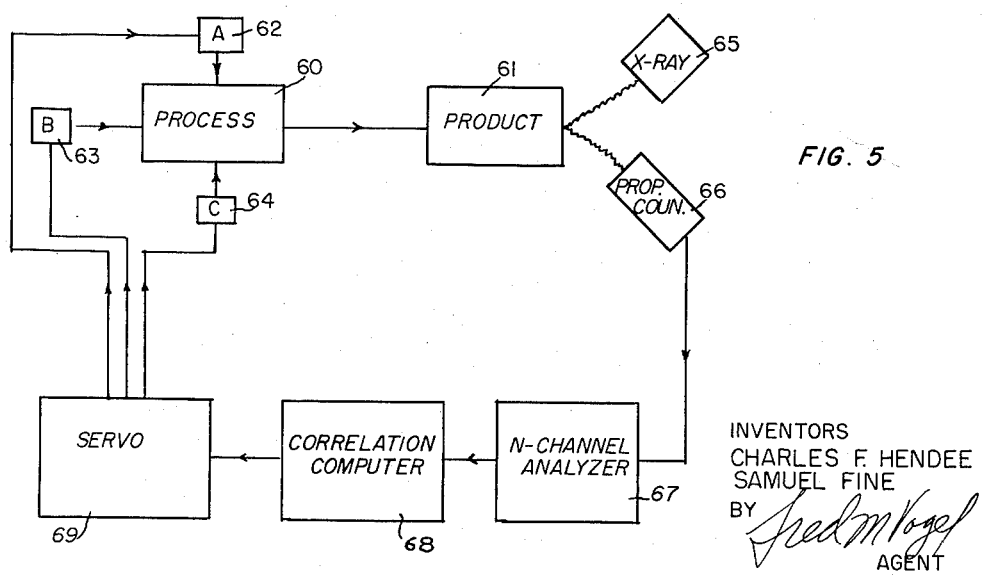
FIG. 5 is a schematic view of a system employing the apparatus of the invention to control a process.

FIG. 5 illustrates the apparatus of the invention utilized to control a process. A process 60 produces a product 61, for example, an alloy or mixture, by combining elements A, B, and C, supplied, respectively, by supply sources 62, 63, and 64. The resultant product 61 is bombarded by high energy X-rays from a source 65 to cause fluorescence therein, and the resultant fluorescent radiation detected by a proportional counter 66. The radiation characteristic of each of the elements A, B and C produces characteristic pulse amplitudes in the counter 66 which are then supplied to a N-channel pulse amplitude analyzer 67. For this process, only three channels are necessary in the analyzer 67. The pulses are sorted according to their amplitude in the analyzer 67 and supplied to a correlation computer 68. The elements A, B and C are, of course, known; hence, the amplitudes of the pulses produced by their characteristic radiation are also known and the analyzer is adjusted to accept only those pulses having the desired amplitudes. The amounts of the elements A, B and C in the product 61 determines the pulses per second per channel of the analyzer.

By calibration, it may be established that a given number of A pulses represents the correct amount of that constituent in the product. The same information is obtained with regard to the B and C pulses. The computer is adjusted to provide information to a servomechanism 69 dependent upon the deviation, if any, between the number of pulses per second actuatlly received from the analyzer compared to the predetermined amount indicating the correct amount of the particular constituent in question. For example, 30% of element A in the desired product corresponds to 500 pulses per second from the A-channel of the analyzer. If the number of pulses per second received is lower, for example, 400 pulses per second, the computer feeds a signal to the servo 69 which is coupled to the supply source 62 of the A constituent and causes the source 62 to feed a larger amount of the A ingredient into the process. Equilibrium is established when the computer receives 500 pulses per second from the A-channel of the analyzer, indicating that the correct amount of the ingredient A is present in the product 61. The supply sources for the B and C ingredients are similarly controlled.

It will be evident that the arrangement illustrated in FIG. 5 affords the important advantage over existing arrangements of providing simultaneous and instantaneous control of more than one step in the process in a nondestructive manner. In the arrangement illustrated, the proper amounts of the ingredients A, B and C introduced in the process are simultaneously and instantaneously controlled by the apparatus of the invention. Further, the reaction conditions of the process may be likewise controlled where they have a direct influence on the resultant composition of the final product.

While we have described our invention in connection with specific embodiments and applications, other modifications thereof will be readily apparent to those skilled in this art without departing from the spirit and scope of the invention as defined in the appended claims.

What is claimed is:

1. A method of analyzing a material for constituent elements thereof, comprising the steps of exposing a specimen of said material to radiation of sufficient intensity to excite the characteristic fluorescent X-ray spectrum of at least one of said elements, directly detecting said fluorescent X-radiation with a proportional counter producing therefrom a succession of electrical pulses having varying amplitudes proportional to the wavelengths in said spectrum and at different rates, measuring the numbers of pulses in adjacent narrow amplitude ranges to determine the distribution of said pulses in terms of numbers per given amplitude range, and comparing said pulse amplitude distribution with that obtained in like manner from a material of known composition, thereby to obtain an indication of the composition of the specimen.

2. A method of analyzing a material for constituent elements thereof, comprising the steps of exposing a specimen of said material to radiation of sufficient intensity to excite the characteristic fluorescent X-ray spectrum of at least one of said elements, directly detecting said fluorescent X-radiation with a proportional counter producing therefrom a succession of electrical pulses having varying amplitudes proportional to the wavelengths in said spectrum and at different rates, measuring the numbers of pulses in adjacent narrow amplitude ranges to determine the distribution of said pulses in terms of numbers per given narrow amplitude range and the amplitude values at which the peak numbers of pulses exist, and comparing the total number of pulses in an amplitude range having one of said peak amplitudes substantially at the center thereof with the total number of pulses in a like amplitude range obtained in like manner from a material of known composition, thereby to obtain an indication of the composition of the specimen.

3. A method of analyzing a material for constituent elements thereof, comprising the steps of exposing a specimen of said material to radiation of sufficient intensity to excite the fluorescent X-ray spectrum of at least one of said elements, directly detecting said fluorescent X-radiation with a proportional counter producing therefrom a succession of electrical pulses having varying amplitudes proportional to the wavelengths in said spectrum and at different rates, separating the pulses amplitude-wise into narrow amplitude ranges, counting the numbers of pulses in each amplitude range to determine the amplitude values at which the peak numbers of pulses exist, and comparing the total number of pulse counts in an amplitude range having one of said peak amplitudes substantially at the center thereof with the number of counts in a like amplitude range obtained in like manner from a material of known composition, thereby to obtain an indication of the composition of the specimen.

4. A method of analyzing a material for constituent elements thereof, comprising the steps of exposing a specimen of said material to radiation of sufficient intensity to excite the fluorescent X-ray spectrum of at least one of said elements, directly detecting said fluorescent X-radiation with a proportional counter producing therefrom a succession of electrical pulses having varying amplitudes proportional to the wavelengths in said spectrum and at different rates, counting the numbers of pulses in adjacent narrow amplitude ranges to determine the distribution of said pulses in terms of numbers per given narrow amplitude range and the amplitude values at which the peak numbers of pulses exist, said pulses having amplitude values falling into groups of closely similar amplitudes with some just below and some just above the peak values, measuring the amplitude range covered by one of said groups at a predetermined pulse rate, and comparing said last-measured value with a value obtained in like manner from a material of known composition, thereby to obtain an indication of the composition of the specimen.

5. A method as set forth in claim 4 wherein the measurement of the amplitude range is carried out at a pulse rate of about half the peak value, the last-measured value is divided by the amplitude value of the peak, and the resultant quotient is compared with a value obtained in like manner from a material of known composition.

References Cited in the file of this patent

UNITED STATES PATENTS

| | | |
|---|---|---|
| 2,449,066 | Friedman | Sept. 14, 1948 |
| 2,490,674 | Christ et al. | Dec. 6, 1949 |
| 2,578,722 | McCartney et al. | Dec. 18, 1951 |
| 2,635,192 | Cordovi | Apr. 14, 1953 |
| 2,848,624 | Friedman et al. | Aug. 19, 1958 |

OTHER REFERENCES

Electron & Nuclear Counters, by Korff, published by D. Von Nostrand Co., Inc. in 1946, pp. 34 and 35.

Sourcebook of Atomic Energy, by Glasstone, published in S. Von Nostrand Inc., New York, in 1950, pp. 131, 133 and 135.

X-ray absorption and Emission, by Liebhafsky, Analytical Chemistry, vol. 26, No. 1, January 1954, pp. 26–31.